United States Patent [19]

Douglas

[11] Patent Number: 4,991,341
[45] Date of Patent: Feb. 12, 1991

[54] CONTROL SYSTEM FOR UNIFORM SPRAYING OF PLANTS

[75] Inventor: Barry D. Douglas, Mountain View, Calif.

[73] Assignee: FMC Corporation, Chicago, Ill.

[21] Appl. No.: 414,622

[22] Filed: Sep. 29, 1989

Related U.S. Application Data

[63] Continuation of Ser. No. 145,173, Jan. 19, 1988, abandoned.

[51] Int. Cl.⁵ .............................. A01C 13/00
[52] U.S. Cl. ...................................... 47/1.7
[58] Field of Search ............... 239/77; 47/1.7, 1.43; 111/1, 7

[56] References Cited

U.S. PATENT DOCUMENTS

| | | | |
|---|---|---|---|
| 1,454,824 | 5/1923 | Stubfors | 47/1.7 |
| 2,278,124 | 10/1966 | Wolford | 239/77 |
| 2,587,240 | 2/1952 | Spreng | 239/77 |
| 2,925,222 | 2/1960 | Spreng | 239/77 X |
| 3,013,728 | 12/1961 | Banovac | 239/77 |
| 3,147,568 | 9/1964 | Inhofer | 47/1.7 |
| 3,599,866 | 8/1971 | Bolton | 47/1.7 X |
| 3,609,913 | 10/1971 | Rose | 47/1.43 |
| 3,683,547 | 8/1972 | Harden | 47/1.7 |
| 3,848,635 | 11/1974 | Scheffler, Jr. | 239/77 X |
| 3,866,397 | 2/1975 | Koziol | 47/1.7 X |
| 3,959,924 | 6/1976 | Allen, Jr. | 47/1.43 |
| 4,206,569 | 6/1980 | Randolph | 47/1.43 X |
| 4,255,922 | 3/1981 | Hiyama et al. | 47/1.7 X |
| 4,257,190 | 3/1981 | Dykes | 47/1.7 X |
| 4,768,713 | 9/1988 | Roper | 239/99 X |
| 4,823,268 | 4/1989 | Giles et al. | 239/77 X |

FOREIGN PATENT DOCUMENTS 1193963  6/1970  United Kingdom ............ 47/1.43 X

Primary Examiner—Robert A. Hafer
Attorney, Agent, or Firm—Ronald C. Kamp; Megley R. B.

[57] ABSTRACT

A control system for providing uniform spraying of plants and for spraying only areas containing plants. A plurality of plant sensors each detect the presence or absence of plants in a narrow field of view and cause spray nozzles to provide a spray solution to only areas containing plants. A ground speed sensor causes the volume of spray solution to be adjusted to provide a predetermined density of coverage of plants irrespective of the ground speed of a sprayer.

4 Claims, 2 Drawing Sheets

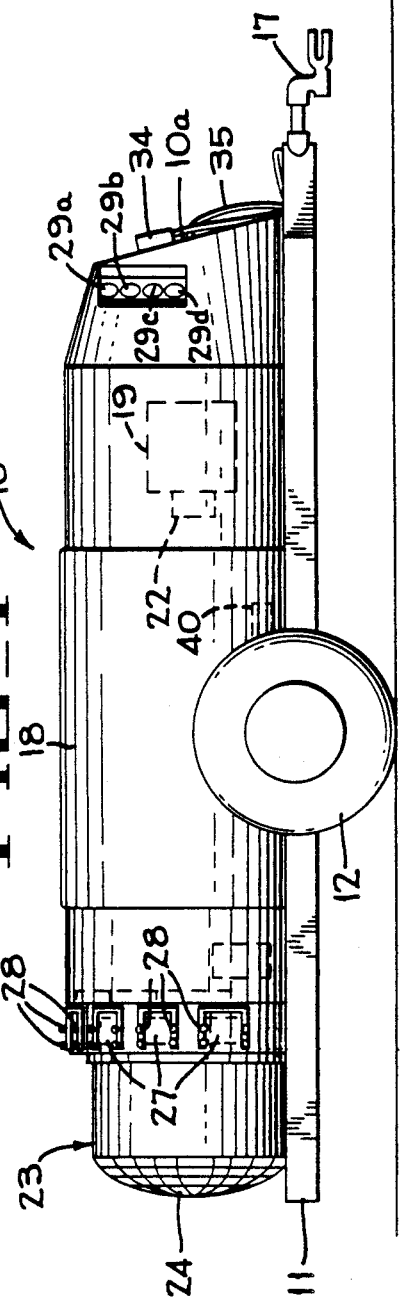
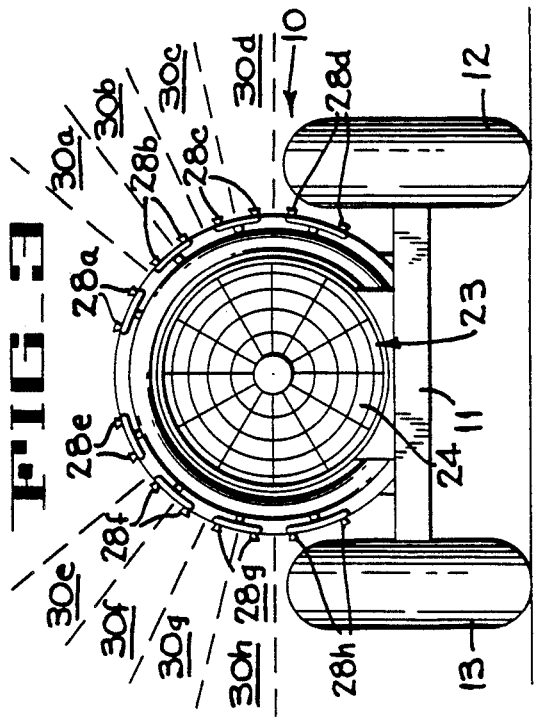
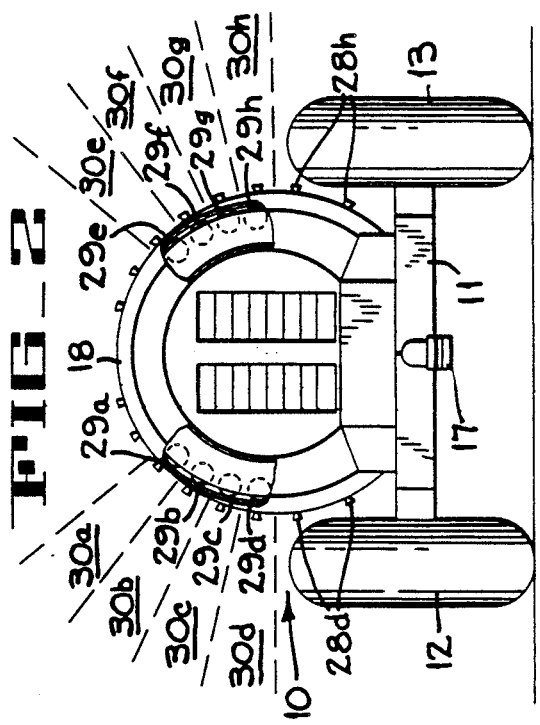

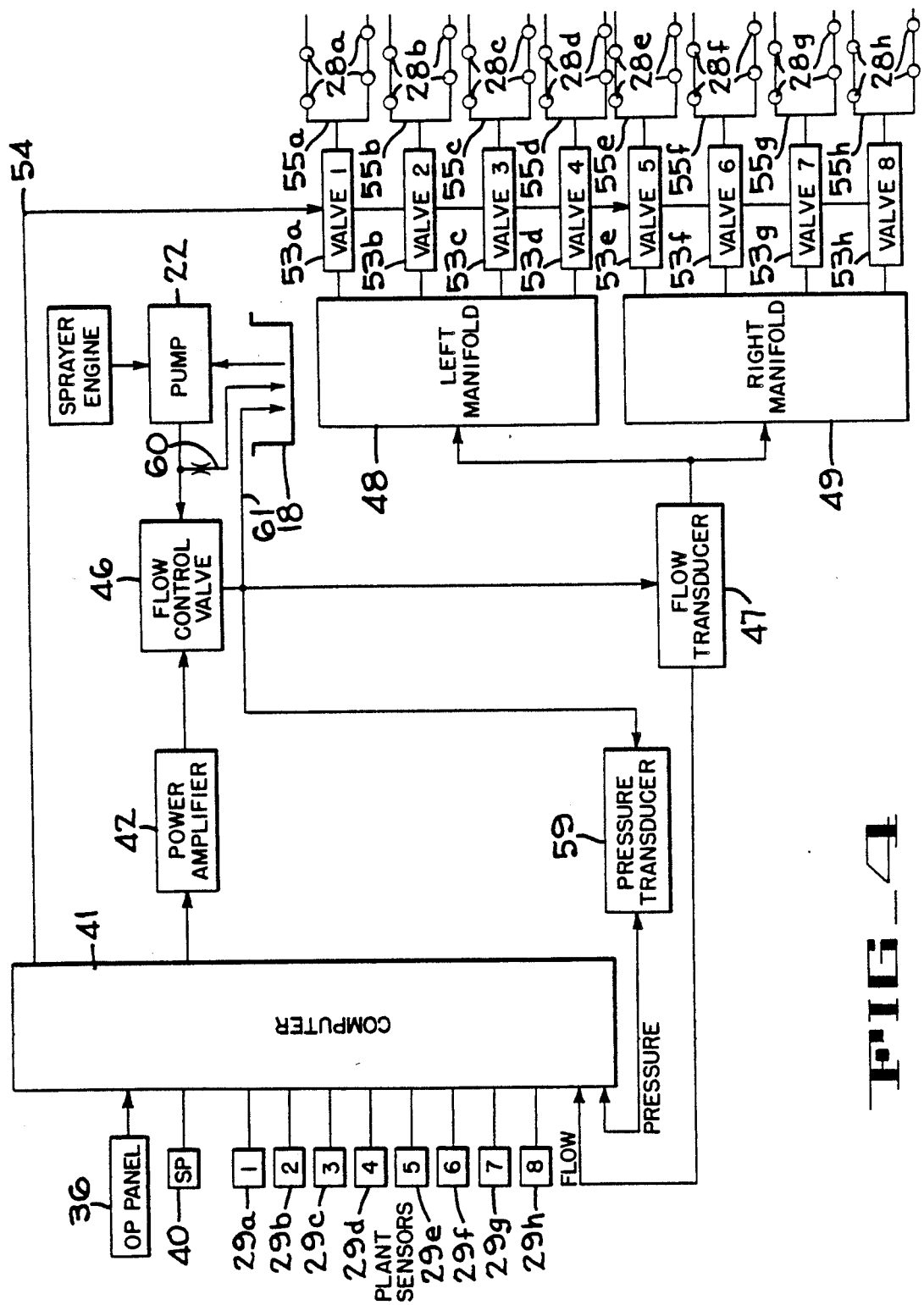
FIG_4

CONTROL SYSTEM FOR UNIFORM SPRAYING OF PLANTS

This application is a continuation of application Ser. No. 07/145,173, filed Jan. 19, 1988, now abandoned. su

CROSS-REFERENCE TO RELATED APPLICATION

Details of an apparatus for sensing the presence and profile of plants to be sprayed by apparatus of the present invention are disclosed in a copending application entitled "PLANT PROFILING SENSOR" filed on even date herewith with Ser. No. 07/144,992 and having the same inventor.

BACKGROUND OF THE INVENTION

The present invention relates to apparatus for spraying plants with agricultural solutions, such as pesticides of fungicides, and more particularly, to sprayers which conserve spray solution by sensing the presence or absence of plants and supplying solution only to areas containing plants.

Air sprayers have been employed for many years to apply pesticides, fungicides and other agricultural liquid solutions to the foliage and fruits of orchards, grooves and vineyards. An air sprayer generally employs a liquid flow system and an air flow system designed to work together to deliver a controlled air-spray pattern which penetrates the foliage and fruits of a plant. The liquid flow system of the sprayer includes a holding tank mounted on a trailer frame, a plurality of spray nozzles, a pump which is driven by an engine on the trailer frame or by a power take off of a tractor which pulls the spray trailer, conduits and valving for delivering the spray solution from the tank to the pump and subsequently to nozzles under regulated pressure. The air flow system employs the blower assembly having at least one discharge opening for directing an air blast generally transversely of the path of travel of the sprayer. The spray nozzles are disposed in the discharge opening to deliver atomized spray solutions for entrainment in the air blast.

One known type of air sprayer for spraying orchards includes a centrifical or squirrel cage fan which is disposded behind the spray tank on the sprayer trailer. The centrifical fan includes a housing having air outlet openings oriented transversely of the path of travel of the sprayer, and an inlet opening extending rearwardly and longitudinally of the sprayers path of travel. Normally, a pair of deflector housings are connected to each outlet opening. Each deflector housing has a "fishtail" shape and an arcuate discharge opening which extends transversely of the sprayer. The arcuate opening is adapted to deliver an air blast extending over an outward, widely diverging pattern. Typically, the deflector housings are adjustably mounted to the respective centrifical fans so that the air blast may be directed at various angles relative to the horizontal. This type of spray is normally used to spray two rows of plants at one time, the deflector housing being adjusted to direct the air blasts in opposite transverse directions relative to the path of movement of the sprayer. Such sprayers deliver the spray solution over a predetermined area irrespective of the presence or absence of plants along the row of plants. This can result in a substantial waste of spray solution when plants are smaller than average or when plants are missing from a row.

SUMMARY OF THE INVENTION

The present invention provides an air sprayer having a control system which senses the presence or absence of plants as the sprayer moves along the ground and turns on sprayer nozzles to cover only areas which contain plants to be sprayed. A plurality of plant sensors mounted around the upper periphery of the sprayer each sense the presence or absence of plants in a narrow field of view and each sensor provides a signal which actuates a corresponding spray nozzle that provides spray solution to an area in which a plant is sensed. The control system also senses ground speed of the sprayer and adjusts the volume of spray solution to provide a predetermined density of coverage of the plants irrespective of the ground speed of the sprayer A computer can be used to receive input signals from a ground speed sensor and from the plant sensors and to provide control signals to a plurality of valves which control a quantity of spray from the individual spray nozzles. A manual control can be adjusted by a human operator to set the level of spray density to the plants.

BRIEF DESCRIPTION OF THE DRAWINGS

FIG. 1 is a side elevation illustrating the air sprayer apparatus which includes the sprayer control system of the present invention.

FIG. 2 is a front elevation of the air sprayer apparatus disclosed in FIG. 1.

FIG. 3 is a rear elevation of the air sprayer apparatus disclosed in FIG. 1.

FIG. 4 is a diagrammatic illustration of a control system of the present invention for use in an air sprayer apparat us.

DESCRIPTION OF THE PREFERRED EMBODIMENT

Referring now more particularly to FIGS. 1-3, an air sprayer apparatus 10 for orchards and the like includes a main frame 11 which is movable on a pair of wheels 12, 13. A tongue 17 is adapted for connection to a tractor or other source of propulsion through an orchard or vineyard. A holding tank 18 for carrying an agricultural spray solution is mounted over the wheels 12, 13 and an engine 19 for operating a pump 22 and a blower assembly 23 is mounted on the front portion of frame 11. The blower assembly 23 includes an air inlet opening 24 and a plurality of outlet openings 27 adjacent to a plurality of spray nozzles 28. The blower assembly provides an air blast through the outlet openings 27 which cause spray solution from nozzles 28 to be blown outwardly onto plants (not shown) adjacent to sprayer 10. A plurality of plant sensors 29a–29h (FIGS. 1, 2) mounted along the front portion of sprayer apparatus 10 each sense the presence or absence of plants in a conical area 30a–30h extending radially outward from apparatus 10 (FIG. 2). Sensor 29a senses any plant present in conical area 30a; sensor 29b senses any plant present in conical area 30b, etc. Sensors 29a-29h can be ultrasonic transducers such as the Model 604142 manufactured by the Polaroid Corporation, Cambridge, Mass.

A control box 34 (FIG.1) having means for mounting on a front portion 10a of sprayer apparatus 10 is connected to apparatus 10 by a flexible signal cable 35. The control box 34 includes a plurality of push buttons or other controls (not shown) on an operator's panel 36 (FIG. 4) for selecting spray density and other parameters by a human operator. The control box 34 can be unhooked from the sprayer apparatus and moved into the cab of a tractor (not shown) to provide convenient selection of spray control parameters by the human operator. A speed sensor 40 (FIGS. 1, 4) connected to one of the wheels 12, 13 provides speed signals proportional to the ground speed of the sprayer apparatus.

As spray apparatus 10 moves along the ground each of the plant sensors 29a-29h (FIGS. 2, 4) senses the presence or absence of plants in the correpsonding conical area 30a-30h adjacent to the front portion of apparatus 10 and sends a "plant-present" or "plant--absent" signal to a computer 41 (FIG. 4). The computer stores the signals until the nozzles 28a-28h are adjacent to the sensed plants. Computer 41 then provides valve control signals to any of a plurality of valves 53a-53h corresponding to the plant sensors 29a-29h which have sent a "plant-present" signal to computer 41. For example, when sensor 29a (FIG. 4) detects a plant, computer 41 sends a valve control signal over lead 54 which causes valve 53a to open so pump 22 provides fluid through valve 46, transducer 47 and a conduit 55a to a cluster of nozzles 28a. Nozzles 28a and blower assembly 23 provide fluid to a plant in conical area 30a (FIG. 3). When any or all of the sensors 29a -29h detect plants the corresponding valves 53a-53h, conduits 55a-55h and nozzles 28a-28h provide fluid in the corresponding conical area 30a-30h. Flow transducer 47 provides computer 41 with information concerning rate of fluid flow to manifolds 48, 49 and a pressure trnasducer 59 provides a signal representative of fluid pressure provided to manifolds 48, 49. As fluid flow to manifolds 48, 49 decreases, pressure from pump 22 increases, causing pressure transducer 59 to provide a signal to computer 41 which causes amplifier 42 to partially close valva 46. Partially closing valve 46 causes the pressure from pump 22 to increase and causes fluid flow through a bypass pipe 60 to increase slightly. Bypass pipe 60 and a fluid return pipe 61 allow fluid to be pumped from tank 18 by pump 22 whenever engine 19 is running.

The present invention includes means for sensing the presence or absence of plants in a plurality of zones adjacent to the sprayer apparatus and supplies pesticides or fungicides to only the zones containing plants, thus reducing waste of materials. A speed sensor senses ground speed of the sprayer apparatus and adjusts the volume of spray solution to provide a predetermined density of coverage of the plants irrespective of the ground speed of the apparatus.

Although the best mode contemplated for carrying out the presnet invention has been herein shown and described, it will be apparent that modification and variation may be made without departing from what is regarded to be the subject matter of the invention.

What is claimed is:

1. A control system for providing uniform spraying of plants by a vehicle having a source of liquid product, said system comprising:
    a plurality of spray nozzle means arranged on one side of said vehicle;
    a pump connected to supply product under pressure to said plurality of spray nozzles;
    a plurality of first valves, each of which is interposed between one of said spray nozzle means and said pump, the open ones of said valve defining a total flow requirement;
    a flow control valve interposed between said pump and said plurality of first valves;
    a bypass line; and
    said flow control flow valve being adjustable to direct to said first valves that portion of the output from said pump necessary to supply the total requirement of the open ones of said first valves with the remaining portions of the pumps'output being returned to said source through said bypass line.

2. The invention according to claim 1, and further comprising;
    means for sensing the presence of plants in a plurality of areas adjacent to said vehicle; and
    means for individually opening said first valves in response to said sensing means sensing the presence of a plant.

3. The invention according to claim 1, and further comprising;
    means for sensing the ground speed of said vehicle; and
    means for adjusting said control flow valve in response to said ground sensing means to apply said product at a uniform rate under conditions of varying ground speed.

4. The invention according to claim 1 and further comprising;
    means for sensing ground speed of said vehicle and adjusting said flow control valve to assure uniform application of said product at different ground speeds; and
    means for sensing the presence of plants in a plurality of areas adjacent to said vehicle and for individually opening said first valve means in response to the detection of a plant in an area.

* * * * *